United States Patent
Kawano et al.

(10) Patent No.: US 6,698,902 B2
(45) Date of Patent: Mar. 2, 2004

(54) IMAGE DISPLAYING APPARATUS FOR DISPLAYING AN IMAGE ACCORDING TO LIGHT REFLECTED BY AN OPTICAL SPATIAL MODULATOR ELEMENT

(75) Inventors: Hiroyuki Kawano, Tokyo (JP); Junichi Nishimae, Tokyo (JP); Tatsuki Okamoto, Tokyo (JP); Yukio Satou, Tokyo (JP); Atsuhiro Sono, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 57 days.

(21) Appl. No.: 10/267,031

(22) Filed: Oct. 9, 2002

(65) Prior Publication Data

US 2003/0189692 A1 Oct. 9, 2003

(30) Foreign Application Priority Data

Apr. 3, 2002 (JP) ........................... 2002-101544

(51) Int. Cl.⁷ .............................................. G03B 21/14
(52) U.S. Cl. ................. 353/99; 353/122; 348/771; 359/254
(58) Field of Search ............................. 353/33, 81, 99, 353/122; 359/242, 249, 254, 267, 290, 291, 292, 850, 855; 348/742, 743, 771

(56) References Cited

U.S. PATENT DOCUMENTS

| | | | |
|---|---|---|---|
| 6,349,006 B1 * | 2/2002 | Okamori et al. ............ 359/834 |
| 6,357,878 B1 * | 3/2002 | Sawamura .................... 353/33 |
| 6,382,799 B1 * | 5/2002 | Nishikawa et al. .......... 353/122 |
| 6,454,417 B1 | 9/2002 | Takamoto et al. |
| 2003/0123162 A1 * | 7/2003 | Penn ........................... 359/833 |
| 2003/0128320 A1 * | 7/2003 | Mi et al. ..................... 349/117 |
| 2003/0147158 A1 * | 8/2003 | Penn ........................... 359/833 |

FOREIGN PATENT DOCUMENTS

| | | |
|---|---|---|
| JP | 2000-258703 | 9/2000 |
| JP | 2001-166255 | 6/2001 |

\* cited by examiner

Primary Examiner—William C. Dowling
(74) Attorney, Agent, or Firm—Leydig, Voit & Mayer, Ltd.

(57) ABSTRACT

A digital mirror dence chip has a substrate, micro-mirrors disposed on the substrate, and a glass cover plate disposed over the micro-mirrors. Each micro-mirror is inclined by +10 degrees or –10 degrees with respect to the substrate to be set to an on-state or an off-state. Incident light produced in a lighting source system is totally reflected in a total internal reflection prism and is incident on the micro-mirrors through the glass cover plate. Outgoing light reflected by micro-minors in the on-state passes through a projection lens and is projected onto a screen to form an image on the screen. Also, outgoing light reflected by micro-mirrors in the off-state passes out of the projection lens. The glass cover plate is not parallel to the substrate. Therefore, light specularly reflected by a surface of the glass cover plate passes out of the projection lens.

16 Claims, 8 Drawing Sheets

IMAGE DISPLAYING APPARATUS FOR DISPLAYING AN IMAGE ACCORDING TO LIGHT REFLECTED BY AN OPTICAL SPATIAL MODULATOR ELEMENT

BACKGROUND OF THE INVENTION

1. Field of the Invention

The present invention relates to a projection type image displaying apparatus in which light reflected by a reflection type optical spatial modulator element, such as a digital mirror device (DMD™, simply called DMD hereinafter) chip, is projected onto a screen to display am image included in the light.

2. Description of Related Art

A projection type image displaying apparatus is generally called a digital light processor (DLP) and denotes a projector using a DMD chip. In the DMD chip, a large number of micro-mirrors respectively having a size of 16 $\mu$m square are disposed in a two-dimensional matrix shape at pitches (or intervals) of 17 $\mu$m. Each micro-mirror of the DMD chip is inclined by an angle of +10 degrees so as to be set to an on-state and is inclined by an angle of −10 degrees so as to be set to an off-state. In this case, a flux of light reflected by the micro-mirror in the on-state propagates in an on-direction, and a flux of light reflected by the micro-mirror in the off-state propagates in an off-direction. Therefore, a flux of light reflected on the micro-mirror is switched from the on-direction (or the off-direction) to the off-direction (or the on-direction).

In this case, the position relation between the DMD chip and a projection lens is set so as to make a flux of light reflected by each micro-mirror in the on-state pass through an entrance pupil of the projection lens, and each flux of light passing through the entrance pupil of the projection lens reaches a pixel of a screen. Also, the position relation between the DMD chip and a projection lens is set so as to make a flux of light reflected by each micro-mirror in the off-state pass out of the entrance pupil of the projection lens, and no light reaches the screen. Therefore, a flux of light reflected by each micro-mirror in the on-state brightens the corresponding pixel of the screen, and a flux of light reflected by each micro-mirror in the off-state does not brighten the corresponding pixel of the screen. When fluxes of light are incident on the micro-mirrors of the DMD chip respectively, fluxes of outgoing light reflected by the micro-mirrors in the on-state have image information. The fluxes of outgoing light having the image information pass through the projection lens and are projected onto the screen. Therefore, an image is displayed on the screen according to the image information.

FIG. 9 is a view showing the configuration of a conventional image displaying apparatus. FIG. 10A shows the position relation between a total internal reflection (TIR) prism and a DMD chip shown in FIG. 9. FIG. 10B shows fluxes of light incident on micro-mirrors of a DMD chip shown in FIG. 9.

In FIG. 9, 110 indicates a high pressure mercury lamp (or a lighting source system) for generating light and radiating parallel light. 120 indicates a plurality of condenser lenses (or the lighting source system) for converging the parallel light radiated from the high pressure mercury lamp 110 onto a focal point. 130 indicates a rod integrator (or the lighting source system) for receiving the converged light output from the condenser lenses 120 and outputting a plurality of fluxes of light having a uniform intensity distribution. 140 indicates a relay lens system for relaying the fluxes of light output from the rod integrator 130. A diaphragm 141 having an aperture is placed in the relay lens system 140. The fluxes of light output from the rod integrator 130 are deformed in the diaphragm 141. 160 indicates a DMD chip. 150 indicates a total internal reflection (TIR) prism (or a total reflection prism) for totally reflecting the fluxes of light received from the relay lens system 140 so as to send the fluxes of light to the DMD chip 160 and transmitting the fluxes of light reflected by the DMD chip 160. 170 indicates a projection lens (or a projecting optical system) for projecting the fluxes of light, which are reflected by the DMD chip 160 and transmitted through the TIR prism 150, onto a screen. Here, the screen of the conventional image displaying apparatus is omitted in FIG. 9.

Also, in FIG. 10A, 151 indicates a surface (hereinafter, called an opposite-to-DMD surface) of the TIR prism 150. The opposite-to-DMD surface 151 is opposite to the DMD chip 160. 161 indicates a glass cover plate of the DMD chip 160. 162 indicates each of a large number of micro-mirrors of the DMD chip 160. 163 indicates a substrate of the DMD chip 160. The substrate 163 of the DMD chip 160 is placed so as to be parallel to the opposite-to-DMD surface 151 of the TIR prism 150. Also, the glass cover plate 161 is placed so as to be parallel to a flat surface of the substrate 163.

Next, an operation of the conventional image displaying apparatus will be described below.

Parallel light is emitted from the high pressure mercury lamp 110 and is converged onto a focal point of the condenser lens 120. An incident end face of the rod integrator 130 is placed at the focal point of the condenser lens 120. Therefore, converged light output from the condenser lens 120 is incident on the rod integrator 130. In the rod integrator 130, a plurality of fluxes of light are produced from the converged light, intensities of the fluxes of light are equalized, and the fluxes of light having an almost uniform intensity distribution are output from an outgoing end face of the rod integrator 130.

Thereafter, the fluxes of light output from the rod integrator 130 pass through the relay lens system 140 having the diaphragm 141 and are incident on the TIR prism 150. The fluxes of light incident on the TIR prism 150 are totally reflected on a face of the TIR prism 150 and pass through the opposite-to-DMD surface 151 and the glass cover plate 161 in that order, and the fluxes of light are incident on the DMD chip 160. In the DMD chip 160, each flux of incident light is reflected on the corresponding micro-mirror 162 set to either the on-state or the off-state and propagates in the on-direction or off-direction as a flux of outgoing light. A plurality of fluxes of outgoing light reflected on the micro-mirrors 162 of the on-state and propagating in the on-direction are returned from the DMD chip 160 to the TIR prism 150, pass through the projection lens 170 and are projected onto a screen (not shown). Therefore, an image is displayed on the screen.

Because the conventional image displaying apparatus has the above-described configuration, a portion of the light totally reflected on a face of the TIR prism 150 is reflected on the opposite-to-DMD surface 151 placed at a boundary surface between the TIR prism 150 and the air, and the portion of the light undesirably passes through the projection lens 170. Also, another portion of the light totally reflected on a face of the TIR prism 150 is reflected on a boundary surface between the glass cover plate 161 and the air, and the portion of the light undesirably passes through the projection lens 170. Therefore, the portions of the light are projected on the screen, and a problem has arisen that a contrast of the image displayed on the screen deteriorates due to the portions of the light.

This problem will be described in detail with reference to FIG. 10A and FIG. 10B.

In cases where rays of light other than light reflected on the micro-mirrors 162 of the on-state pass through the entrance pupil of the projection lens 170, a contrast between white and black in the image displayed on the screen deteriorates due to the rays of light. The rays of light other than light reflected on the micro-mirrors 162 of the on-state are derived from light reflected on a top surface of the glass cover plate 161, light reflected on a bottom surface of the glass cover plate 161 and light reflected on the opposite-to-DMD surface 151 of the TIR prism 150.

As shown in FIG. 10A, C1 denotes rays of specular reflection light. The rays of specular reflection light C1 are obtained by specularly reflecting a portion of light entering the TIR prism 150 on the top surface of the glass cover plate 161 opposite to the TIR prism 150. C2 denotes rays of specular reflection light. The rays of specular reflection light C2 are obtained by specularly reflecting a portion of light entering in the TIR prism 150 on the bottom surface of the glass cover plate 161 opposite to the DMD chip 160. C3 denotes rays of specular reflection light. The rays of specular reflection light C3 are obtained by specularly reflecting a portion of light entering in the TIR prism 150 on the opposite-to-DMD surface 151 of the TIR prism 150. Therefore, the rays of specular reflection light C1 and C2 are generated on the boundary surface between the glass cover plate 161 and the air due to a difference in refractive index between the glass cover plate 161 and the air, and the rays of specular reflection light C3 are generated on the boundary surface between the TIR prism 150 and the air due to a difference in refractive index between the TIR prism 150 and the air.

When no antireflection film is used for the TIR prism 150 or the glass cover plate 161, reflectivity of light passing through each boundary surface is equal to almost 4%. Also, even though an antireflection film is used for the TIR prism 10 and the glass cover plate 161, because the spectrum of the light has a wide spectral range corresponding to white light and because the light has a wide incident angle to each micro-mirror 162, reflectivity of the light is only lowered to 0.5 to 1% at the best. Therefore, the rays of the specular reflection light C1, C2 and C3 are inevitably generated and function as stray light.

In particular, as shown in FIG. 10B, each micro-mirror 162 of the DMD chip 160 is illuminated with a flux of light having a diverging angle θ. Therefore, to efficiently illuminate the DMD chip 160 with the fluxes of light, it is required to illuminate the DMD chip 160 with fluxes of light converged in the relay lens system 140 at a large diverging angle and to project the fluxes of light reflected on the micro-mirrors 162 of the on-state onto the screen through the projection lens 170 having a large relative aperture (or a small F-number). In this case, because the rays of specular reflection light C1, C2 and C3 overlap with a portion of each flux of light reflected on the corresponding micro-mirror 162 of the on-state, the rays of specular reflection light C1, C2 and C3 pass through the entrance pupil of the projection lens 170 having a large relative aperture.

The rays of specular reflection light C1 incident on the projection lens 170 of the conventional image displaying apparatus are shown in FIG. 11, and the rays of specular reflection light C3 incident on the projection lens 170 of the conventional image displaying apparatus are shown in FIG. 12. The constituent elements, which are the same as those shown in FIG. 9, are indicated by the same reference numerals as those of the constituent elements shown in FIG. 9.

Also, FIG. 13A shows a flux of incident light incident on a micro-mirror set to the on-state and a flux of outgoing light reflected on the micro-mirror, and FIG. 13B shows a flux of incident light incident on a micro-mirror set to the off-state and a flux of outgoing light reflected on the micro-mirror. FIG. 14 shows an angular distribution (θx, θy) of a flux of incident light, an angular distribution (θx, θy) of a flux of outgoing light reflected on one micro-mirror 162 of the on-state, an angular distribution (θx, θy) of the specular reflection light C1, C2 and C3 and an angular distribution (θx, θy) of a flux of outgoing light reflected on one micro-mirror 162 of the off-state.

In FIG. 13A, and FIG. 13B, one micro-mirror 162 is set to the on-state by inclining the micro-mirror 162 counter-clockwise by 10 degrees with respect to a flat surface of the substrate 163 of the DMD chip 160, and the micro-mirror 162 is set to the off-state by inclining the micro-mirror 162 clockwise by 10 degrees with respect to a flat surface of the substrate 163 of the DMD chip 160. A flux of incident light Fin incident on the micro-mirror 162 has a diverging angle of θ=16.4 degrees. This diverging angle of the flux of incident light Fin corresponds to an F-number (F =1/(2×tan θ)) of the relay lens system 140 set to F=1.7. The flux of incident light Fin is incident on the micro-mirror 162 at an incident angle of 20 degrees to the DMD chip 160. That is, a principal ray Rin of the flux of incident light Fin makes an angle of 20 degrees to a normal NO of the DMD chip 160. The flux of incident light Fin is deformed in the diaphragm 141 so as not to overlap with a flux of outgoing light Fout reflected on the micro-mirror 162.

In FIG. 14, AD1 denotes an angular distribution of the flux of incident light Fin, AD2 denotes an angular distribution of the flux of outgoing light Fout reflected on the micro-mirror 162 of the on-state, AD3 denotes an angular distribution of the rays of specular reflection light C1, C2 and C3, and AD4 denotes an angular distribution of the flux of outgoing light Fout reflected on the micro-mirror 162 of the off-state. EP denotes an entrance pupil of the projection lens 170. The entrance pupil EP is formed in a circular shape having a radius of 16.4 degrees.

The angular distribution AD1 of the flux of incident light Fin is formed in a D shape by straightly cutting off a right portion of a circular-shaped flux. Therefore, each of the angular distributions AD2 to AD4 of the light fluxes obtained by reflecting the flux of incident light Fin is formed in the D shape.

When the flux of incident light Fin is incident on the micro-mirror 162 set to the on-state, the flux of outgoing light Fout reflected on the micro-mirror 162 propagates in the on-direction. In this case, a principal ray Rout1 of the flux of outgoing light Fout propagates in parallel to the normal NO of the DMD chip 160. Therefore, as shown in FIG. 14, the flux of outgoing light Fout reflected on the micro-mirror 162 of the on-state has an angular distribution centering around (θx, θy)=(0,0). Here, the normal NO of the DMD chip 160 is parallel to a Z axis, θx denotes an angle between the propagation direction of light and the normal NO of the DMD chip 160 on an X-Z plane, and θy denotes an angle between the propagation direction of light and the normal NO of the DMD chip 160 on a Y-Z plane.

Also, when the flux of incident light Fin is incident on the micro-mirror 162 set to the off-state, the flux of outgoing light Fout reflected on the micro-mirror 162 propagates in the off-direction. In this case, a principal ray Rout2 of the flux of outgoing light Fout propagates in a direction making an angle of 40 degrees to the normal NO of the DMD chip 160. Therefore, as shown in FIG. 14, the flux of outgoing light Fout reflected on the micro-mirror 162 of the off-state has an angular distribution centering around ($\theta$x, $\theta$y)=(40 degrees, 0). Also, because the rays of specular reflection light C1, C2 and C3 are obtained by specularly reflecting the flux of incident light Fin on a plane parallel to the flat surface of the substrate 163 of the DMD chip 160, as shown in FIG. 14, the rays of specular reflection light C1, C2 and C3 have an angular distribution centering around ($\theta$x, $\theta$y)=(20 degrees, 0).

To receive the flux of outgoing light Fout reflected on the micro-mirror 162 of the on-state in the projection lens 170, the projection lens 170 is, for example, set to the F-number of F=1.7 to have the entrance pupil EP in which the flux of outgoing light Fout reflected on the micro-mirror 162 of the on-state is entered. In this case, though the flux of outgoing light Fout reflected on the micro-mirror 162 of the on-state passes through the entrance pupil EP of the projection lens 170, a portion of the rays of specular reflection light C1, C2 and C3 undesirably pass through the entrance pupil EP of the projection lens 170. Therefore, a contrast of an image displayed on the screen according to the flux of outgoing light Fout reflected on the micro-mirror 162 of the on-state deteriorates due to the portion of the rays of specular reflection light C1, C2 and C3 undesirably passing through the entrance pupil EP of the projection lens 170.

Also, because each micro-mirror 162 is inclined with respect to the flat surface of the substrate 163 of the DMD chip 160, an area not covered with any inclined micro-mirror 162 exists on the substrate 163 of the DMD chip 160. In this case, a portion of the incident light Fin passes though the area of the substrate 163 not covered with any inclined micro-mirror 162 and is undesirably scattered or reflected on the substrate 163 of the DMD chip 160. The portion of the incident light Fin scattered or reflected on the substrate 163 of the DMD chip 160 undesirably passes through the projection lens 170 as stray light, and a contrast of the image deteriorates.

Also, an open space is preset between each pair of micro-mirrors 162 adjacent to each other. An area of the open spaces is almost equal to 10% of a total area of the substrate 163 of the DMD chip 160. Therefore, a portion of the incident light Fin passes though the open space between each pair of micro-mirrors 162 adjacent to each other and is undesirably scattered or reflected on the substrate 163 of the DMD chip 160. In this case, the portion of the incident light Fin scattered or reflected on the substrate 163 of the DMD chip 160 undesirably passes through the projection lens 170 as stray light, and a contrast of the image deteriorates.

SUMMARY OF THE INVENTION

An object of the present invention is to provide, with due consideration to the drawbacks of the conventional image displaying apparatus, an image displaying apparatus in which a contrast of a displayed image is improved.

The object is achieved by the provision of an image displaying apparatus including a reflection type optical spatial modulator element for receiving a plurality of fluxes of incident light from a lighting source system and outputting a plurality of fluxes of outgoing light including image information, and a projecting optical system for projecting a plurality of fluxes of outgoing light, which are output from the reflection type optical spatial modulator element and propagate in an on-direction, onto a screen to display an image on the screen according to the image information included in the fluxes of outgoing light. The reflection type optical spatial modulator element includes a substrate extending on a reference plane, a transparent cover plate extending in a specific direction not parallel to the reference plane of the substrate, and a plurality of micro-mirrors, disposed on the substrate and respectively inclined by an on-angle or an off-angle with respect to the reference plane of the substrate so as to be set to an on-state or an off-state, for reflecting the fluxes of incident light passing through the transparent cover plate as the fluxes of outgoing light to propagate each flux of outgoing light reflected on the micro-mirror of the on-state in the on-direction and to propagate each flux of outgoing light reflected on the micro-mirror of the off-state in an off-direction.

In the above configuration, because the transparent cover plate is disposed not to be parallel to the reference plane of the substrate, no specular reflection light generated on a surface of the transparent cover plate propagates in the on-direction. Therefore, no specular reflection light passes through the projecting optical system, and a contrast of the displayed image can be improved.

The object is also achieved by the provision of an image displaying apparatus including a total reflection prism having an opposite-to-modulator surface, a reflection type optical spatial modulator element disposed so as to be opposite to the opposite-to-modulator surface of the total reflection prism, receiving the fluxes of incident light output from the lighting source system through the total reflection prism and outputting a plurality of fluxes of outgoing light including image information, and a projecting optical system for projecting the fluxes of outgoing light, which are output from the reflection type optical spatial modulator element and propagate in an on-direction, onto a screen to display an image on the screen according to the image information included in the fluxes of outgoing light. The reflection type optical spatial modulator element includes a substrate, a transparent cover plate, a refractive index matching layer having a refractive index near to both the transparent cover plate and the total reflection prism and placed between the transparent cover plate and the opposite-to-modulator surface of the total reflection prism, and a plurality of micro-mirrors, disposed on the substrate and respectively inclined by an on-angle or an off-angle so as to be set to an on-state or an off-state, for receiving each flux of incident light through the refractive index matching layer and the transparent cover plate, and reflecting the fluxes of incident light as the fluxes of outgoing light to propagate each flux of outgoing light reflected on the micro-mirror of the on-state in the on-direction and to propagate each flux of outgoing light reflected on the micro-mirror of the off-state in an off-direction.

In the above configuration, because the refractive index matching layer is placed between the transparent cover plate and the opposite-to-modulator surface of the total reflection prism, no specular reflection light is generated due to a difference in refractive index between the transparent cover plate and the total reflection prism. Therefore, no specular reflection light passes through the projecting optical system, and a contrast of the displayed image can be improved.

The object is also achieved by the provision of an image displaying apparatus including a reflection type optical spatial modulator element for receiving the fluxes of incident light output from a lighting source system and outputting a plurality of fluxes of outgoing light including image information, and a projecting optical system for projecting the fluxes of outgoing light, which are output from the reflection type optical spatial modulator element and propagate in an on-direction, onto a screen to display an image on the screen according to the image information included in the fluxes of outgoing light. The reflection type optical spatial modulator element includes a transparent cover plate, a plurality of micro-mirrors, respectively inclined by an on-angle or an off-angle so as to be set to an on-state or an off-state, for reflecting the fluxes of incident light passing through the transparent cover plate as the fluxes of outgoing light to propagate each flux of outgoing light reflected on the micro-mirror of the on-state in the on-direction and to propagate each flux of outgoing light reflected on the micro-mirror of the off-state in an off-direction, and a substrate for supporting the micro-mirrors and preventing each flux of incident light, which passes through the transparent cover plate and is not incident on any micro-mirror, from going out to the projecting optical system.

In the above configuration, because the substrate prevents each flux of incident light, which passes through the transparent cover plate and is not incident on any micro-mirror, from going out to the projecting optical system, even though light passes through an open space between each pair of micro-mirrors adjacent to each other, the light incident on the substrate does not pass through the projecting optical system. Therefore, a contrast of the displayed image can be improved.

DETAILED DESCRIPTION OF THE PREFERRED EMBODIMENTS

Embodiments of the present invention will now be described with reference to the accompanying drawings.
Embodiment 1

Figure 1:
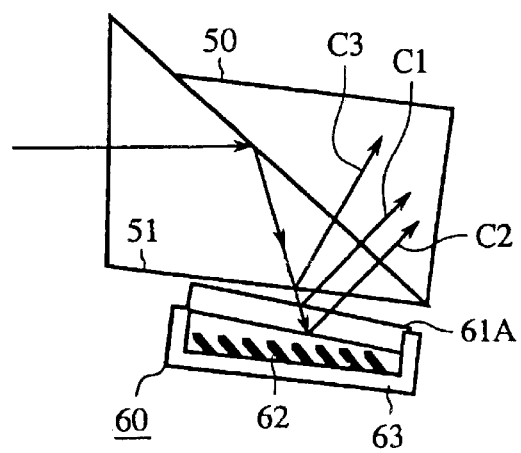
FIG. 1 is a view of a TIR prism and a DMD chip disposed in an image displaying apparatus according to a first embodiment of the present invention.
Figure 9:
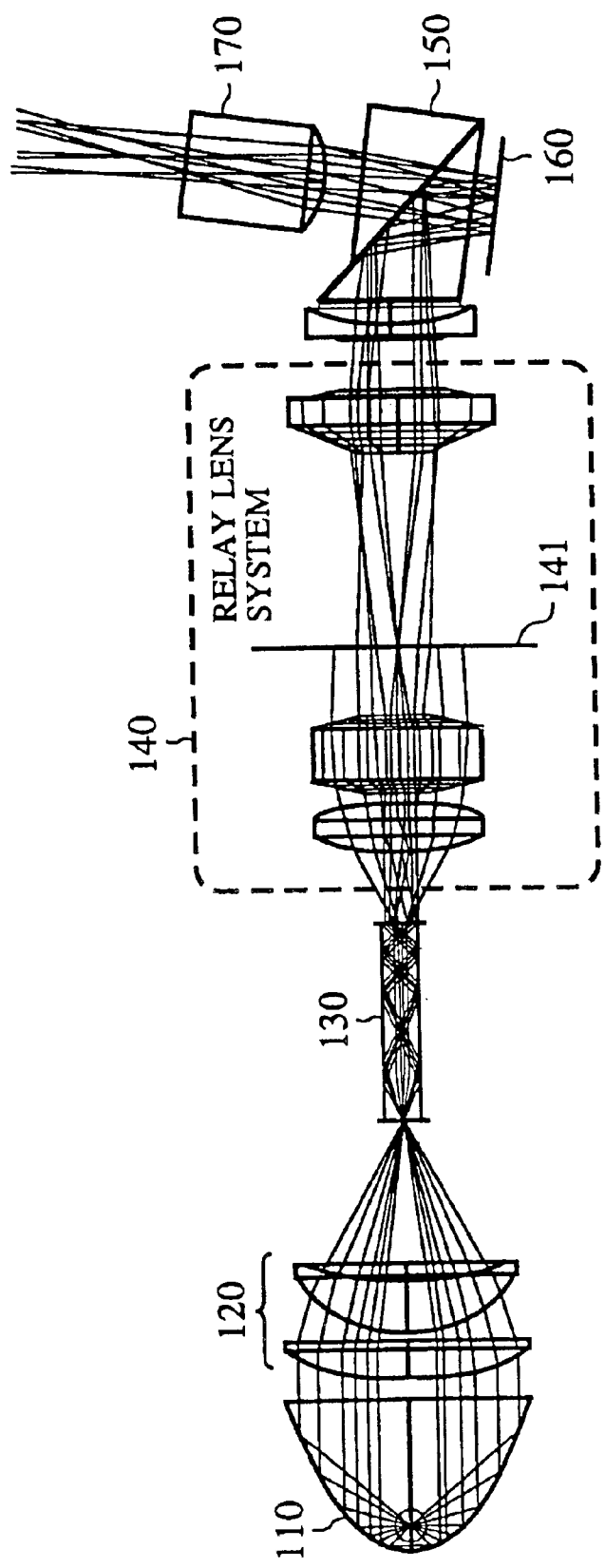
FIG. 9 is a view showing the configuration of a conventional image displaying apparatus.
Figure 10A:
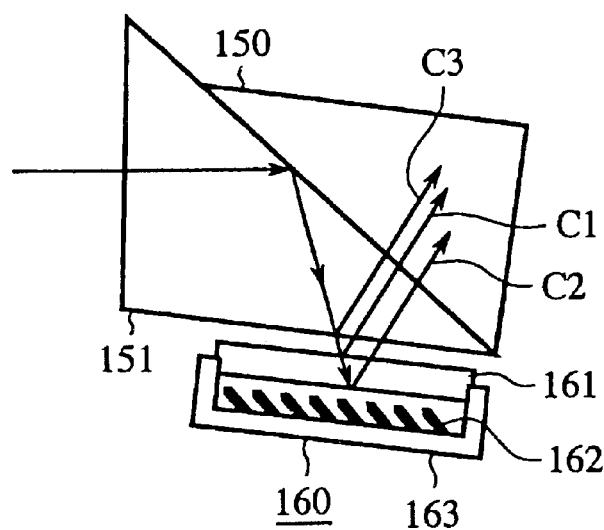
FIG. 10A shows the position relation between a TIR prism and a DMD chip shown in FIG. 9.
Figure 10B:
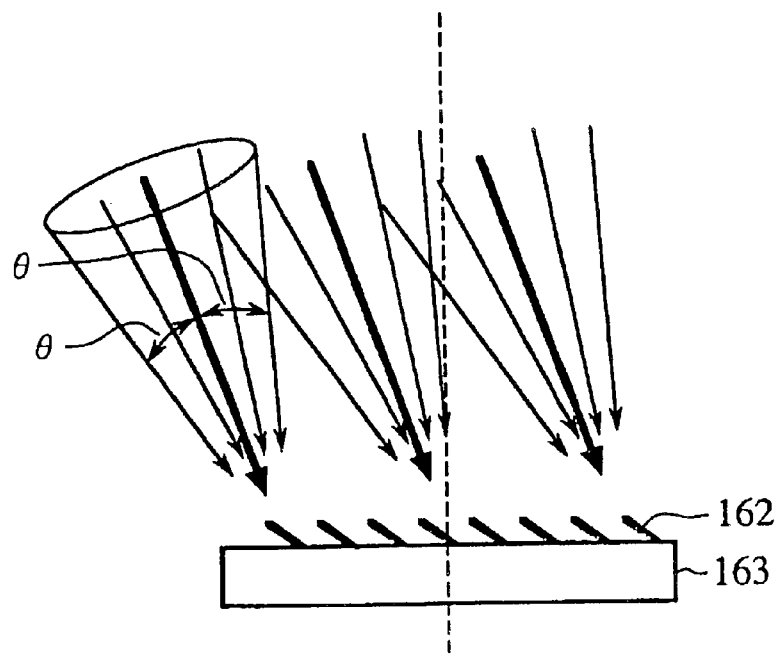
FIG. 10B shows fluxes of light incident on micro-mirrors of a DMD chip shown in FIG. 9.
Figure 11:
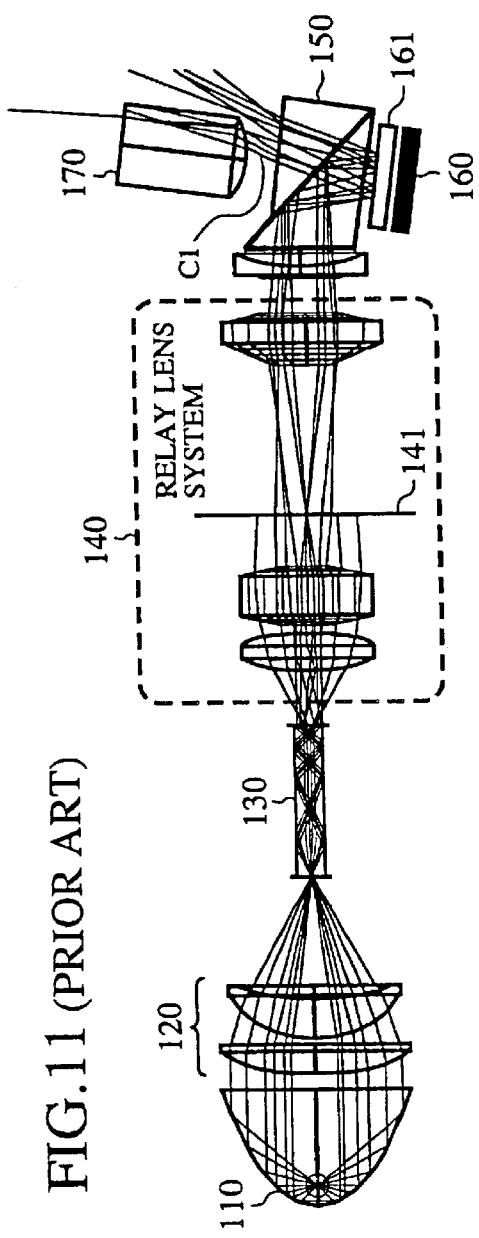
FIG. 11 shows rays of specular reflection light incident on a projection lens in the conventional image displaying apparatus shown in FIG. 9.
Figure 12:
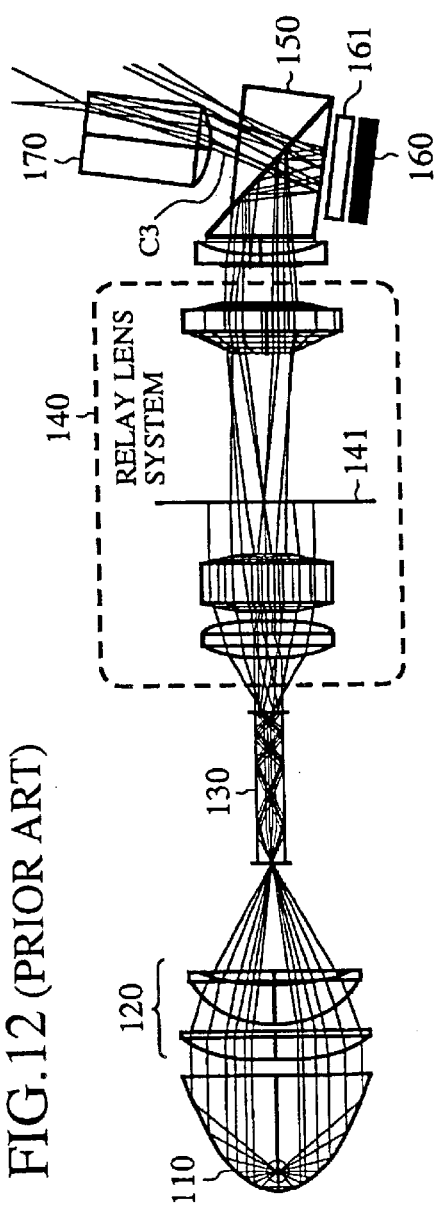
FIG. 12 shows rays of specular reflection light incident on a projection lens in the conventional image displaying apparatus shown in FIG. 9.
Figure 13A:
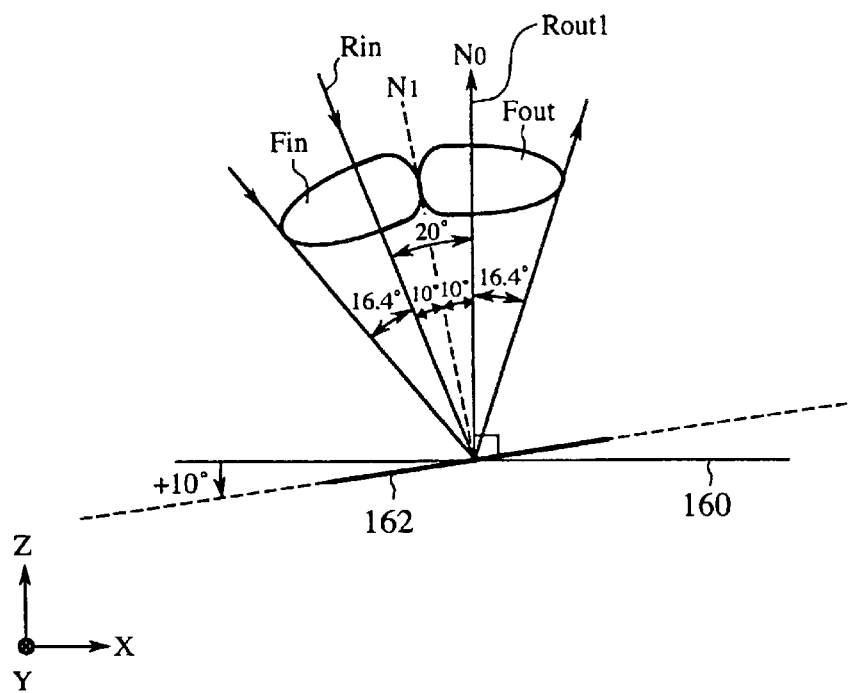
FIG. 13A shows a flux of incident light incident on a micro-mirror set to an on-state and a flux of outgoing light reflected by the micro-mirror.
Figure 13B:
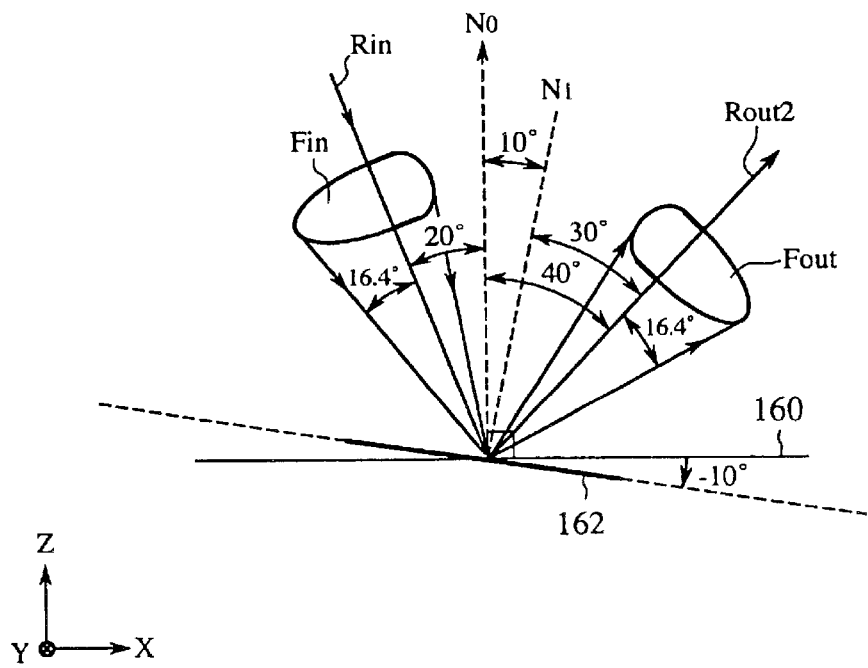
FIG. 13B shows a flux of incident light incident on a micro-mirror set to an off-state and a flux of outgoing light reflected by the micro-mirror.
Figure 14:
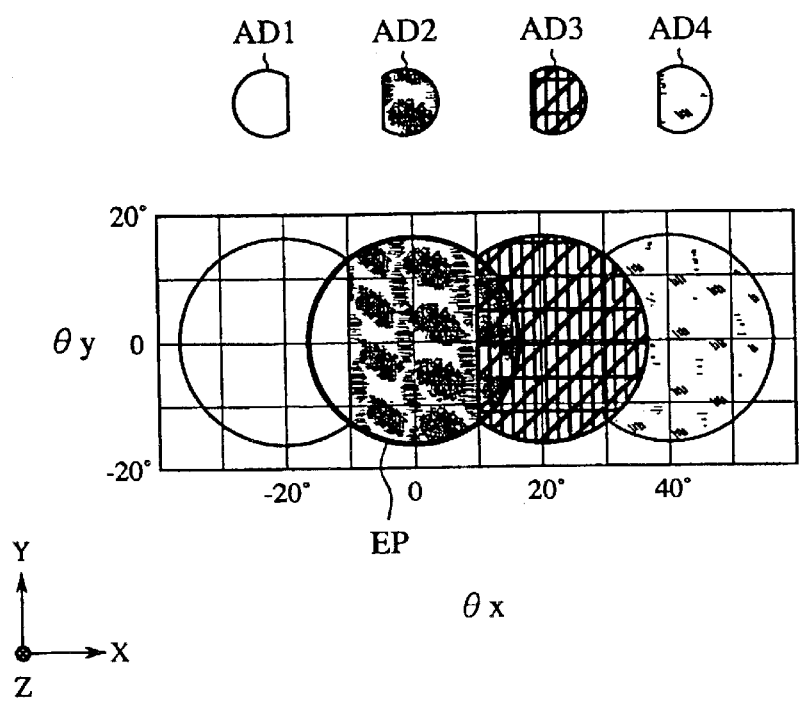
FIG. 14 shows an angular distribution ($\theta x$, $\theta y$) of a flux of incident light, an angular distribution ($\theta x$, $\theta y$) of a flux of outgoing light reflected by a micro-mirror in the on-state, an angular distribution ($\theta x$, $\theta y$) of specular reflection light functioning as stray light and an angular distribution ($\theta x$, $\theta y$) of a flux of outgoing light reflected by a micro-mirror in the off-state.

FIG. 1 is a view of a TIR prism and a DMD chip disposed in an image displaying apparatus according to a first embodiment of the present invention. Because constituent elements other than a TIR prism and a DMD chip in an image displaying apparatus of a first embodiment are the same as those shown in FIG. 9, those constituent elements is omitted in FIG. 1.

In FIG. 1, 50 indicates a TIR prism. To prevent a flux of light incident on a projection lens from being not received in an entrance pupil of the projection lens, only fluxes of light incident on the TIR prism 50 are totally reflected by the TIR prism 50, and a plurality of fluxes of outgoing light are straightly transmitted through the TIR prism 50 without loosing any flux of outgoing light. 60 indicates a DMD chip (or a reflection type optical spatial modulator element). 51 indicates an opposite-to-DMD surface (or an opposite-to-modulator surface) of the TIR prism 50. The opposite-to-DMD surface 51 is opposite to the DMD chip 60. 62 indicates each of a large number of micro-mirrors of the DMD chip 60. 61A indicates a glass cover plate (or a transparent cover plate) of the DMD chip 60. The glass cover plate 61A is disposed on the micro-mirrors 62 to protect the micro-mirrors 62. 63 indicates a substrate of the DMD chip 60. A flat surface (or a reference plane) of the substrate 63 of the DMD chip 60 is placed so as to be parallel to the opposite-to-DMD surface 51 of the TIR prism 50. Also, the glass cover plate 61A is inclined with respect to the flat surface of the substrate 63 so as to propagate rays of specular reflection light generated on a surface of the glass cover plate 61A in the off-direction. The micro-mirrors 62 are disposed on the substrate 63 of the DMD chip 60 in a two-dimensional matrix. A flux of incident light Fin has a diverging angle $\theta$=16.4 degrees corresponding to the F-number F=1.7 of a relay lens system, and each micro-mirror 62 is inclined by an inclination angle of 10 degrees clockwise (or an on-angle) or 10 degrees counterclockwise (or an off-angle) with respect to the flat surface of the substrate 63.

As shown in FIG. 1, the glass cover plate 61A is inclined toward the off-direction (or a clockwise direction in FIG. 1)

by a specific cover inclination angle θc with respect to the flat surface of the substrate 63 of the DMD chip 60. In other words, each of top and bottom surfaces of the glass cover plate 61A is not parallel to the flat surface of the substrate 63. Therefore, a propagation direction of the rays of specular reflection light C1 and C2 makes an angle larger than 16.4 degrees to the normal NO of the DMD chip 60, and no ray of specular reflection light C1 and C2 passes through an entrance pupil of a projection lens. Accordingly, a contrast of an image displayed on a screen according to fluxes of light reflected on micro-mirrors 62 of the on-state can be improved.

Figure 2:
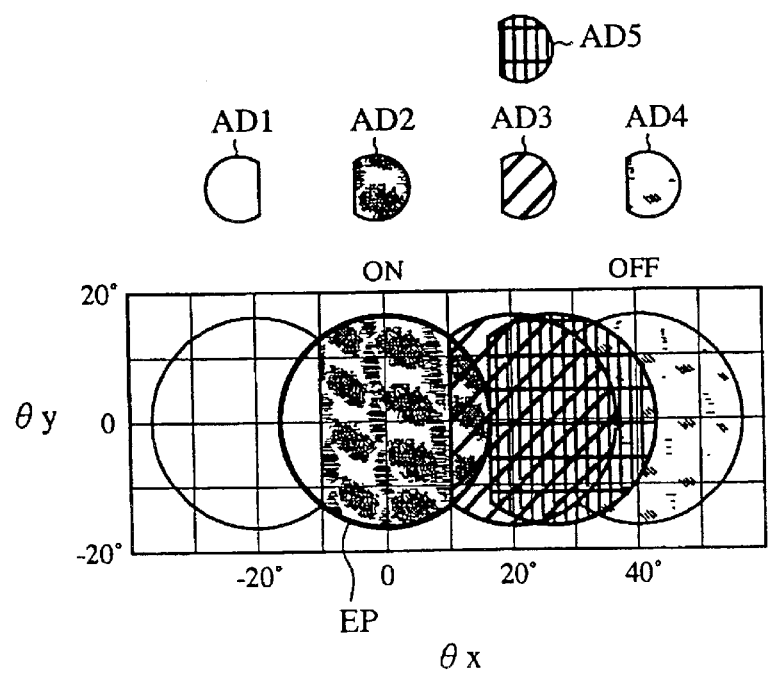
FIG. 2 shows an angular distribution of a flux of incident light, an angular distribution of a flux of outgoing light reflected on a micro-mirror in the on-state, an angular distribution of specular reflection light C1 and C2, an angular distribution of specular reflection light C3 and an angular distribution of a flux of outgoing light reflected on a micro-mirror in the off-state.

FIG. 2 shows an angular distribution (θx, θy) of a flux of incident light, an angular distribution (θx, θy) of a flux of outgoing light reflected on a micro-mirror 62 of the on-state, an angular distribution (θx, θy) of the specular reflection light C1 and C2, an angular distribution (θx, θy) of the specular reflection light C3 and an angular distribution (θx, θy) of a flux of outgoing light reflected on a micro-mirror 62 of the off-state.

In FIG. 2, AD1 denotes an angular distribution of the flux of incident light Fin incident on a micro-mirror 62 at an incident angle of 20 degrees to the DMD chip 60, AD2 denotes an angular distribution of a flux of outgoing light Fout reflected on a micro-mirror 62 of the on-state, AD3 denotes an angular distribution of the rays of specular reflection light C3 reflected on the opposite-to-DMD surface 51, AD4 denotes an angular distribution of a flux of outgoing light Fout reflected on a micro-mirror 62 of the off-state, and AD5 denotes an angular distribution of the rays of specular reflection light C1 and C2 reflected on the top and bottom faces of the glass cover plate 61A. EP denotes an entrance pupil of a projection lens. The entrance pupil EP is formed in a circular shape, and the flux of outgoing light Fout having the angular distribution AD2 passes through the entrance pupil EP of the projection lens to display an image on a screen.

Because the glass cover plate 61A is inclined toward the off-direction (or a clockwise direction in FIG. 1) by a specific cover inclination angle θc with respect to the flat surface of the substrate 63 of the DMD chip 60, the propagation direction of the rays of specular reflection light C1 and C2 reflected on the top and bottom surfaces of the glass cover plate 61A is shifted toward the off-direction by an angle of 2 θc. The specific cover inclination angle θc is larger than 3.2 degrees. Therefore, the rays of specular reflection light C1 and C2 pass out of the entrance pupil EP of the projection lens.

Therefore, the glass cover plate 61A placed to be inclined toward the off-direction can prevent the rays of specular reflection light C1 and C2 reflected on the top and bottom surfaces of the glass cover plate 61A from passing through the projection lens, and stray light generated from the specular reflection light C1, C2 and C3 can be reduced to almost ⅓. Accordingly, a contrast of the image displayed on the screen can be improved. Here, the reduction of adverse influence of the specular reflection light C3 will be described in a second embodiment.

As is described above, in the first embodiment, an image displaying apparatus comprises a lighting source system for outputting a plurality of fluxes of light having a uniform intensity distribution, a relay lens system for relaying the fluxes of light while deforming the fluxes of light, the DMD chip 60 having the micro-mirrors 62 placed on the substrate 63 and the glass cover plate 61A, the TIR prism 50 for totally reflecting the fluxes of light relayed by the relay lens system and illuminating the DMD chip 60 through the glass cover plate 61A with the fluxes of light and transmitting the fluxes of light reflected on the DMD chip 60, and a projection lens (or a projecting optical system) for projecting the fluxes of light transmitted through the TIR prism 50 onto a screen. The lighting source system comprises a high pressure mercury lamp, a group of condenser lenses and a rod integrator. The glass cover plate 61A inclined toward the off-direction is placed on the DMD chip 60 not to be parallel to the substrate 63. Therefore, the glass cover plate 61A placed to be inclined toward the off-direction can prevent the rays of specular reflection light C1 and C2 reflected on the top and bottom surfaces of the glass cover plate 61A from passing through the projection lens, and a contrast of the image displayed on the screen can be improved.

Embodiment 2

Figure 3:
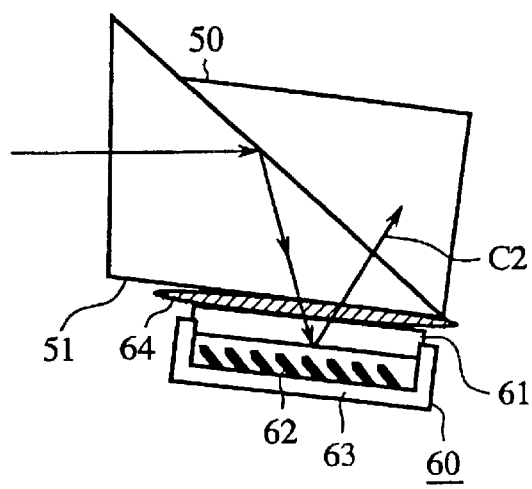
FIG. 3 is a view of a TIR prism and a DMD chip disposed in an image displaying apparatus according to a second embodiment of the present invention.

FIG. 3 is a view of a TIR prism and a DMD chip disposed in an image displaying apparatus according to a second embodiment of the present invention. The constituent elements, which are the same as those shown in FIG. 1, are indicated by the same reference numerals as those of the constituent elements shown in FIG. 1.

In FIG. 3, 61 indicates a glass cover plate (or a transparent cover plate) of the DMD chip 60 for protecting the micro-mirrors 62. The glass cover plate 61 is disposed on the micro-mirrors 62 so as to be parallel to the flat surface of the substrate 63 of the DMD chip 60. 64 indicates a refractive index matching oil layer (or a refractive index matching layer). A space between the opposite-to-DMD surface 51 of the TIR prism 50 and the glass cover plate 61 of the DMD chip 60 is filled with the refractive index matching oil layer 64. The refractive index matching oil layer 64 has a refractive index near to those of the TIR prism 50 and the glass cover plate 61 so as to reduce a change of refractive index in a transmission path of light from the TIR prism 50 to the glass cover plate 61. Therefore, the refractive index matching oil layer 64 prevents the specular reflection light C3 from being generated due to a difference of the refractive index between the TIR prism 50 and the air, and the refractive index matching oil layer 64 prevents the specular reflection light C1 from being generated due to a difference of the refractive index between the glass cover plate 61 and the air.

Figure 4:
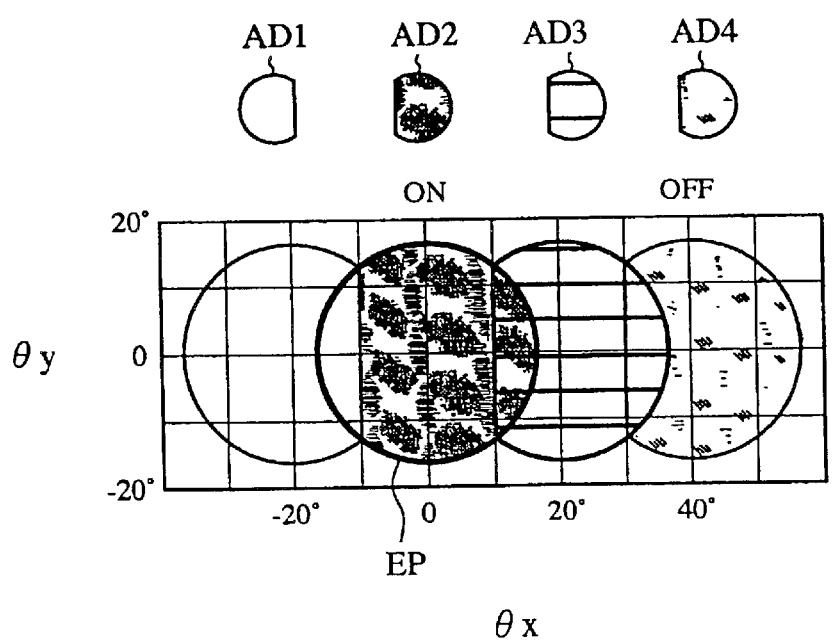
FIG. 4 shows an angular distribution of a flux of incident light, an angular distribution of a flux of outgoing light reflected by a micro-mirror in the on-state, an angular distribution of specular reflection light C2 and an angular distribution of a flux of outgoing light reflected a micro-mirror in the off-state.

FIG. 4 shows the angular distribution AD1 of a flux of incident light, the angular distribution AD2 of a flux of outgoing light reflected on a micro-mirror 62 of the on-state, an angular distribution AD3 of the specular reflection light C2 and the angular distribution AD4 of a flux of outgoing light reflected on a micro-mirror 62 of the off-state.

Because a space between the opposite-to-DMD surface 51 of the TIR prism 50 and the glass cover plate 61 of the DMD chip 60 is filled with the refractive index matching oil layer 64, the specular reflection light C1 reflected on the top surface of the glass cover plate 61 and the specular reflection light C3 reflected on the opposite-to-DMD surface 51 are reduced to almost zero. Therefore, no specular reflection light C1 or C3 is incident on the entrance pupil EP of the projection lens set to the F-number of F=1.7, and only the specular reflection light C2 reflected on the bottom surface of the glass cover plate 61 is incident on the entrance pupil EP of the projection lens. Therefore, the stray light generated from the specular reflection light can be reduced to almost ⅓, and a contrast of the image can be improved. Here, the entrance pupil EP of the projection lens denotes an area indicated by a circle having a radius of 16.4 degrees in the angular distribution AD2.

As is described above, in the second embodiment, an image displaying apparatus comprises a lighting source system for outputting a plurality of fluxes of light having a uniform intensity distribution, a relay lens system for relaying the fluxes of light and deforming the fluxes of light, the DMD chip 60 having the micro-mirrors 62 placed on the substrate 63 and the glass cover plate 61, the TIR prism 50 for totally reflecting the fluxes of light relayed by the relay lens system and illuminating the DMD chip 60 through the glass cover plate 61 with the fluxes of light and transmitting the fluxes of light reflected on the DMD chip 60, and a projection lens (or a projecting optical system) for projecting the fluxes of light transmitted through the TIR prism 50 onto a screen. Also, a space between the opposite-to-DMD surface 51 of the TIR prism 50 and the glass cover plate 61 of the DMD chip 60 is filled with the refractive index matching oil layer 64. Therefore, the generation of both the specular reflection light C1 reflected on the top face of the glass cover plate 61 and the specular reflection light C3 reflected on the opposite-to-DMD surface 51 can be suppressed, and a contrast of the image can be improved.

In the second embodiment, it is preferred that the glass cover plate 61A inclined toward the off-direction not to be parallel to the substrate 63 is arranged in place of the glass cover plate 61 according to the inventive idea of the first embodiment. In this case, in addition to the no generation of the specular reflection light C1 and C3, the glass cover plate 61A prevents the specular reflection light C2 from being received in the projection lens, and a contrast of the image can be further improved.

Embodiment 3

Figure 5:
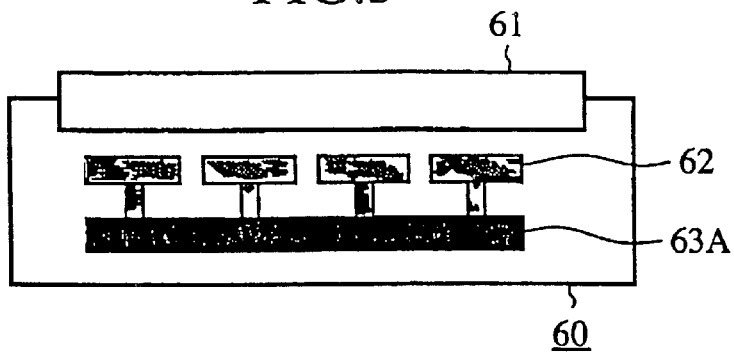
FIG. 5 is a view of a DMD chip disposed in an image displaying apparatus according to a third embodiment of the present invention.

FIG. 5 is a view of the DMD chip 60 disposed in an image displaying apparatus according to a third embodiment of the present invention. The constituent elements, which are the same as those shown in FIG. 1 or FIG. 2, are indicated by the same reference numerals as those of the constituent elements shown in FIG. 1 or FIG. 2.

In FIG. 5, 63A indicates a black-coated substrate of the DMD chip 60. The black-coated substrate 63A is obtained by coating the substrate 63 with black coating material, and light incident on the black-coated substrate 63A is absorbed by the black coating material of the black-coated substrate 63A. In this case, the whole surface of the black-coated substrate 63A is coated with black coating material, or only a surface of the black-coated substrate 63A opposite to the micro-mirrors 62 is coated with black coating material.

As is described in the prior art, an open space is preset between each pair of micro-mirrors 62 adjacent to each other. An area of the open spaces is almost equal to 10% of a total area of the flat surface of the substrate 63A of the DMD chip 60. Therefore, a portion of light incident on the DMD chip 60 passes though the open space between each pair of micro-mirrors 62 adjacent to each other and reaches the substrate 63A of the DMD chip 60. Assuming that a portion of light reaching a substrate of a DMD chip is scattered or reflected on the substrate, the portion of the light scattered or reflected on the substrate of the DMD chip undesirably passes through a projection lens as stray light, and a contrast of an image deteriorates.

In a third embodiment, to prevent the deterioration of the contrast of the image due to stray light scattered or reflected on the substrate, the black-coated substrate 63A is placed under the micro-mirrors 62 to absorb light passing through the open space between each pair of micro-mirrors 62 adjacent to each other. Therefore, no light is scattered or reflected on the black-coated substrate 63A.

As is described above, in the third embodiment, an image displaying apparatus comprises a lighting source system for outputting a plurality of fluxes of light having a uniform intensity distribution, a relay lens system for relaying the fluxes of light and deforming the fluxes of light, the DMD chip 60 having the micro-mirrors 62 placed on the black-coated substrate 63A coated with black coating material and the glass cover plate 61, the TIR prism 50 for totally reflecting the fluxes of light relayed by the relay lens system and illuminating the DMD chip 60 through the glass cover plate 61 with the fluxes of light and transmitting the fluxes of light reflected on the DMD chip 60, and a projection lens (or a projecting optical system) for projecting the fluxes of light transmitted through the TIR prism 50 onto a screen. Therefore, light passing through the open space between each pair of micro-mirrors 62 adjacent to each other is absorbed in the black-coated substrate 63A so as to prevent the light from being scattered or reflected on the black-coated substrate 63A. Accordingly, no light passing through the open space between each pair of micro-mirrors 62 adjacent to each other is incident on the projection lens, and a contrast of the image can be improved.

In the third embodiment, it is preferred that the glass cover plate 61A inclined toward the off-direction not to be parallel to the substrate 63A is arranged in place of the glass cover plate 61 according to the inventive idea of the first embodiment. Also, it is preferred that a space between the opposite-to-DMD surface 51 of the TIR prism 50 and the glass cover plate 61 of the DMD chip 60 is filled with the refractive index matching oil layer 64 according to the inventive idea of the second embodiment. In this case, the glass cover plate 61A prevents the specular reflection light C1 and C2 from being received in the projection lens, and the generation of the specular reflection light C1 and C3 can be suppressed by the refractive index matching oil layer 64. Accordingly, a contrast of the image can be further improved.

Embodiment 4

Figure 6:
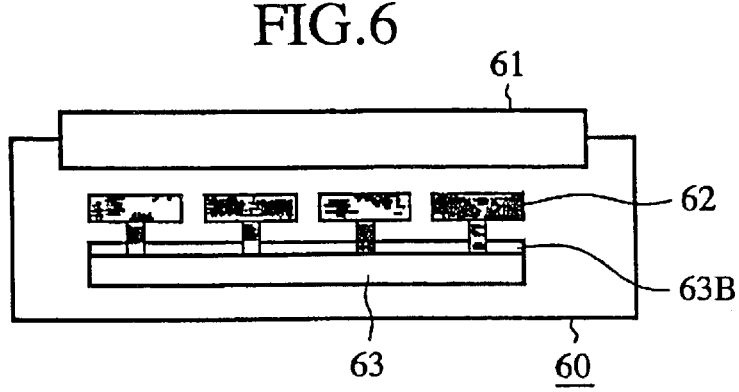
FIG. 6 is a view of a DMD chip disposed in an image displaying apparatus according to a fourth embodiment of the present invention.

FIG. 6 is a view of the DMD chip 60 disposed in an image displaying apparatus according to a fourth embodiment of the present invention. The constituent elements, which are the same as those shown in FIG. 1 or FIG. 2, are indicated by the same reference numerals as those of the constituent elements shown in FIG. 1 or FIG. 2.

In FIG. 6, 63B indicates an antireflection film. The antireflection film 63B is disposed on a surface of the substrate 63 opposite to the micro-mirrors 62 to absorb light passing through the open space between each pair of micro-mirrors 62 adjacent to each other. As compared with the image displaying apparatus of the third embodiment, the substrate 63 with the antireflection film 63B is arranged in place of the black-coated substrate 63A. Therefore, no light is scattered or reflected on the substrate 63.

As is described above, in the fourth embodiment, an image displaying apparatus comprises a lighting source system for outputting a plurality of fluxes of light having a uniform intensity distribution, a relay lens system for relaying the fluxes of light and deforming the fluxes of light, the DMD chip 60 having the glass cover plate 61, the substrate 63, the antireflection film 63B and the micro-mirrors 62 placed on the substrate 63 with the antireflection film 63B, the TIR prism 50 for totally reflecting the fluxes of light relayed by the relay lens system and illuminating the DMD chip 60 through the glass cover plate 61 with the fluxes of light and transmitting the fluxes of light reflected on the DMD chip 60, and a projection lens (or a projecting optical system) for projecting the fluxes of light transmitted through the TIR prism 50 onto a screen. Therefore, light passing through the open space between each pair of micro-mirrors 62 adjacent to each other is absorbed in the antireflection film 63B so as to prevent the light from being scattered or reflected on the substrate 63. Accordingly, no light passing through the open space between each pair of micro-mirrors 62 adjacent to each other is incident on the projection lens, and a contrast of the image can be improved.

In the fourth embodiment, it is preferred that the glass cover plate 61A inclined toward the off-direction not to be parallel to the substrate 63 is arranged in place of the glass cover plate 61 according to the inventive idea of the first embodiment. Also, it is preferred that a space between the opposite-to-DMD surface 51 of the TIR prism 50 and the glass cover plate 61 of the DMD chip 60 is filled with the refractive index matching oil layer 64 according to the inventive idea of the second embodiment. In this case, the glass cover plate 61A prevents the specular reflection light C1 and C2 from being received in the projection lens, and the generation of the specular reflection light C1 and C3 can be suppressed by the refractive index matching oil layer 64. Accordingly, a contrast of the image can be further improved.

Embodiment 5

Figure 7:
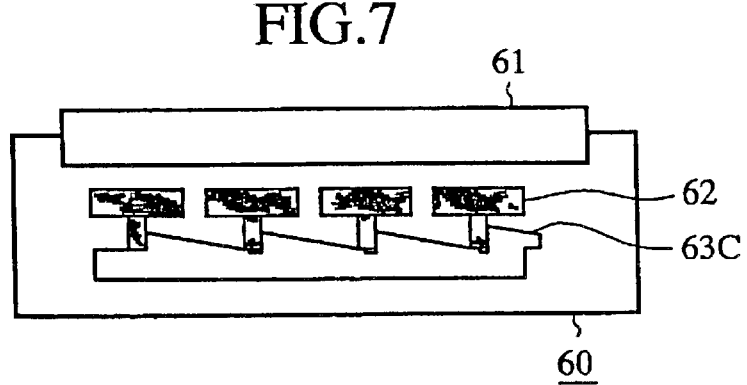
FIG. 7 is a view of the DMD chip disposed in an image displaying apparatus according to a fifth embodiment of the present invention.

FIG. 7 is a view of the DMD chip 60 disposed in an image displaying apparatus according to a fifth embodiment of the present invention. The constituent elements, which are the same as those shown in FIG. 1 or FIG. 2, are indicated by the same reference numerals as those of the constituent elements shown in FIG. 1 or FIG. 2.

In FIG. 7, 63C indicates a substrate having a saw-tooth shaped surface. The saw-tooth shaped surface of the substrate 63C is opposite to the micro-mirrors 62. A plurality of surface portions of the saw-tooth shaped surface of the substrate 63C are inclined with respect to the a flat surface of each micro-mirror 62. Also, the surface portions of the saw-tooth shaped surface of the substrate 63C are spaced at equal intervals so as to place each surface portion just under the corresponding open space between the micro-mirrors 62 adjacent to each other. In this case, when light passing though the open space between each pair of micro-mirrors 62 adjacent to each other is reflected on the substrate 63C having the saw-tooth shaped surface, the propagation direction of the light is shifted toward the off-direction.

Therefore, even though light passing through the open space between each pair of micro-mirrors 62 adjacent to each other is reflected on the substrate 63C, the reflected light does not pass through the projection lens.

As is described above, in the fifth embodiment, an image displaying apparatus comprises a lighting source system for outputting a plurality of fluxes of light having a uniform intensity distribution, a relay lens system for relaying the fluxes of light and deforming the fluxes of light, the DMD chip 60 having the glass cover plate 61, the substrate 63C having the saw-tooth shaped surface and the micro-mirrors 62 placed on the substrate 63C, the TIR prism 50 for totally reflecting the fluxes of light relayed by the relay lens system and illuminating the DMD chip 60 through the glass cover plate 61 with the fluxes of light and transmitting the fluxes of light reflected on the DMD chip 60, and a projection lens (or a projecting optical system) for projecting the fluxes of light transmitted through the TIR prism 50 onto a screen. Therefore, light passing through the open space between each pair of micro-mirrors 62 adjacent to each other does not pass through the projection lens. Accordingly, a contrast of the image can be improved.

In the fifth embodiment, it is preferred that the glass cover plate 61A inclined toward the off-direction not to be parallel to a bottom flat surface of the substrate 63C is arranged in place of the glass cover plate 61 according to the inventive idea of the first embodiment. Also, it is preferred that a space between the opposite-to-DMD surface 51 of the TIR prism 50 and the glass cover plate 61 of the DMD chip 60 is filled with the refractive index matching oil layer 64 according to the inventive idea of the second embodiment. In this case, the glass cover plate 61A prevents the specular reflection light C1 and C2 from being received in the projection lens, and the generation of the specular reflection light C1 and C3 can be suppressed by the refractive index matching oil layer 64. Accordingly, a contrast of the image can be further improved.

Also, in the fifth embodiment, it is preferred that the substrate 63C is coated with black coating material according to the inventive idea of the third embodiment. Also, it is preferred that an antireflection film is disposed on the saw-tooth shaped surface of the substrate 63C according to the inventive idea of the fourth embodiment. In this case, the reception of light passing through the open spaces in the projection lens can be reliably prevented, and a contrast of the image can be further improved.

Embodiment 6

Figure 8:
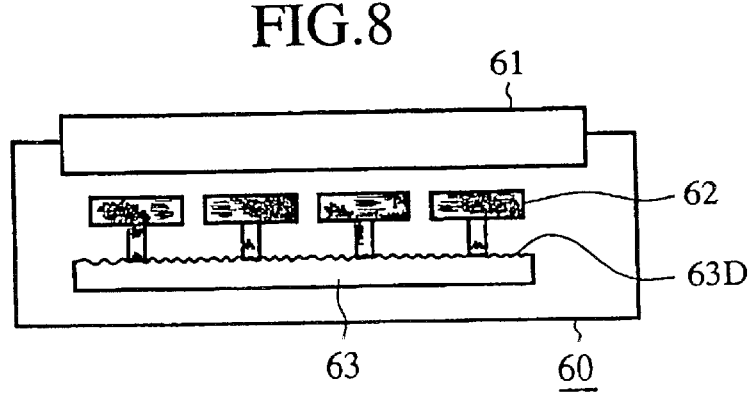
FIG. 8 is a view of the DMD chip disposed in an image displaying apparatus according to a sixth embodiment of the present invention.

FIG. 8 is a view of the DMD chip 60 disposed in an image displaying apparatus according to a sixth embodiment of the present invention. The constituent elements, which are the same as those shown in FIG. 1 or FIG. 2, are indicated by the same reference numerals as those of the constituent elements shown in FIG. 1 or FIG. 2.

In FIG. 8, 63D indicates a light scattering surface of the substrate 63 opposite to the micro-mirrors 62. As compared with the image displaying apparatus of the third embodiment, the substrate 63 with the light scattering surface 63D is arranged in place of the black-coated substrate 63A. The light scattering surface 63D of the substrate 63 has a large number of inclines planes. When light passes through the open space between each pair of micro-mirrors 62 adjacent to each other, the light is scattered on the light scattering surface 63D of the substrate 63 in various directions. Therefore, a large portion of the light passing through the open spaces is scattered in various directions different from the on-direction, and the scattered light passing through the projection lens can be considerably reduced.

As is described above, in the sixth embodiment, an image displaying apparatus comprises a lighting source system for outputting a plurality of fluxes of light having a uniform intensity distribution, a relay lens system for relaying the fluxes of light and deforming the fluxes of light, the DMD chip 60 having the glass cover plate 61, the substrate 63 with the light scattering surface 63D and the micro-mirrors 62 placed on the substrate 63, the TIR prism 50 for totally reflecting the fluxes of light relayed by the relay lens system and illuminating the DMD chip 60 through the glass cover plate 61 with the fluxes of light and transmitting the fluxes of light reflected on the DMD chip 60, and a projection lens (or a projecting optical system) for projecting the fluxes of light transmitted through the TIR prism 50 onto a screen. Therefore, a large portion of light passing through the open space between each pair of micro-mirrors 62 adjacent to each other does not pass through the projection lens. Accordingly, a contrast of the image can be improved.

In the sixth embodiment, it is preferred that the glass cover plate 61A inclined toward the off-direction not to be parallel to the substrate 63 is arranged in place of the glass cover plate 61 according to the inventive idea of the first embodiment. Also, it is preferred that a space between the opposite-to-DMD surface 51 of the TIR prism 50 and the glass cover plate 61 of the DMD chip 60 is filled with the refractive index matching oil layer 64 according to the inventive idea of the second embodiment. In this case, the glass cover plate 61A prevents the specular reflection light C1 and C2 from being received in the projection lens, and the generation of the specular reflection light C1 and C3 can be suppressed by the refractive index matching oil layer 64. Accordingly, a contrast of the image can be further improved.

Also, in the sixth embodiment, it is preferred that the substrate 63 is coated with black coating material according to the inventive idea of the third embodiment. Also, it is preferred that an antireflection film is disposed on the substrate 63 according to the inventive idea of the fourth embodiment. Also, it is preferred that a surface of the substrate 63 opposite to the micro-mirrors 62 is formed in a saw-tooth shape according to the inventive idea of the fifth embodiment. In this case, the reception of light passing through the open spaces in the projection lens can be reliably prevented, and a contrast of the image can be further improved.

In this specification, the image displaying apparatus according to each of the first to sixth embodiments is described. However, it is applicable that an image displaying apparatus be structured by combining inventive ideas of embodiments arbitrarily selected from the first to sixth embodiments.

What is claimed is:

1. An image displaying apparatus comprising:
   a lighting source outputting a plurality of fluxes of incident light;
   a reflecting optical spatial modulator element receiving the fluxes of incident light output from the lighting source and outputting a plurality of fluxes of outgoing light including image information; and
   a projecting optical system projecting a plurality of fluxes of the outgoing light output from the reflecting optical spatial modulator element and propagating in an on-direction, onto a screen to display an image on the screen according to the image information included in the fluxes of outgoing light, wherein the reflecting optical spatial modulator element comprises:
   a substrate extending on a reference plane;
   a transparent cover plate extending in a direction not parallel to the reference plane; and
   a plurality of micro-mirrors disposed on the substrate and respectively inclined by an on-angle or an off-angle with respect to the reference plane in an on-state and in an off-state, respectively, for reflecting the fluxes of incident light passing through the transparent cover plate as the fluxes of outgoing light and propagating each flux of outgoing light reflected by a micro-mirror in the on-state in an on-direction, and propagating each flux of outgoing light reflected by a micro-mirror in the off-state in an off-direction.

2. An image displaying apparatus according to claim 1, further comprising:
   a total reflection prism having an opposite-to-modulator surface; and
   a refractive index matching layer having a refractive index near refractive indices of the transparent cover plate and the total reflection prism and located between the transparent cover plate and the opposite-to-modulator surface of the total reflection prism, wherein the fluxes of incident light output from the lighting source pass through the total reflection prism, the refractive index matching layer, and the transparent cover plate, in that order, and are incident on the micro-mirrors of the reflecting optical spatial modulator element.

3. The image displaying apparatus according to claim 1, wherein the substrate of the reflecting optical spatial modulator element has a black surface, opposite to the micro-mirrors to absorb light incident on the black surface.

4. The image displaying apparatus according to claim 1, wherein the substrate of the reflecting optical spatial modulator element has an antireflection film on a surface opposite to the micro-mirrors, absorbing light incident on the antireflection film.

5. The image displaying apparatus according to claim 1, wherein the substrate of the reflecting optical spatial modulator element has a surface with a saw-tooth shaped in cross-section, opposite to the micro-mirrors, reflecting light incident on the surface with the saw-tooth shaped in directions other than the on-direction.

6. The image displaying apparatus according to claim 1, wherein the substrate of the reflecting optical spatial modulator element has a light scattering surface, opposite to the micro-mirrors, scattering light incident on the light scattering surface in directions other than the on-direction.

7. An image displaying apparatus comprising:
   a lighting source for outputting a plurality of fluxes of incident light;
   a total reflection prism having an opposite-to-modulator surface;
   a reflecting optical spatial modulator element, opposite the opposite-to-modulator surface of the total reflection prism, receiving the fluxes of incident light output from the lighting source through the total reflection prism and outputting a plurality of fluxes of outgoing light including image information; and
   a projecting optical system for projecting the fluxes of outgoing light output from the reflecting optical spatial modulator element and propagating in an on-direction, onto a screen to display an image on the screen according to the image information included in the fluxes of outgoing light, wherein the reflecting optical spatial modulator element comprises:
   a substrate;
   a transparent cover plate;
   a refractive index matching layer having a refractive index near to refractive indices of the transparent cover plate and the total reflection prism and located between the transparent cover plate and the opposite-to-modulator surface of the total reflection prism; and
   a plurality of micro-mirrors, disposed on the substrate and respectively inclined by an on-angle and an off-angle in an on-state or an off-state, respectively, receiving each flux of incident light through the refractive index matching layer and the transparent cover plate, and reflecting the fluxes of incident light as the fluxes of outgoing light, propagating each flux of outgoing light reflected by the micro-mirror in the on-state in an on-direction, and propagating each flux of outgoing light reflected by the micro-mirror in the off-state in an off-direction.

8. The image displaying apparatus according to claim 7, wherein the substrate of the reflecting optical spatial modulator element has a black surface, opposite to the micro-mirrors, absorbing light incident on the black surface.

9. The image displaying apparatus according to claim 7, wherein the substrate of the reflecting optical spatial modulator element has an antireflection film on a surface opposite the micro-mirrors, absorbing light incident on the antireflection film.

10. The image displaying apparatus according to claim 7, wherein the substrate of the reflecting optical spatial modulator element has a surface with saw-tooth shape in cross-section, opposite the micro-mirrors, reflecting light incident on the surface with the saw-tooth shape in directions other than the on-direction.

11. The image displaying apparatus according to claim 7, wherein the substrate of the reflecting optical spatial modulator element has a light scattering surface, opposite the micro-mirrors, scattering light incident on the light scattering surface in directions other than the on-direction.

12. An image displaying apparatus comprising:
- a lighting source for outputting a plurality of fluxes of incident light;
- a reflecting optical spatial modulator element receiving the fluxes of incident light output from the lighting source and outputting a plurality of fluxes of outgoing light including image information; and
- a projecting optical system projecting the fluxes of outgoing light, output from the reflection type optical spatial modulator element and propagating in an on-direction, onto a screen to display an image on the screen according to the image information included in the fluxes of outgoing light, wherein the reflecting optical spatial modulator element comprises:
  - a transparent cover plate;
  - a plurality of micro-mirrors, respectively inclined by one of an on-angle and an off-angle in an on-state and an off-state, respectively, reflecting the fluxes of incident light passing through the transparent cover plate as the fluxes of outgoing light and propagating each flux of outgoing light reflected on the micro-mirror in the on-state in an on-direction and propagating each flux of outgoing light reflected by the micro-mirror in the off-state in an off-direction; and
  - a substrate supporting the micro-mirrors and preventing each flux of incident light, which passes through the transparent cover plate and is not incident on any micro-mirror from reaching projecting optical system.

13. The image displaying apparatus according to claim 12, wherein the substrate of the reflecting optical spatial modulator element has a black surface, opposite the micro-mirrors, absorbing light incident on the black surface.

14. The image displaying apparatus according to claim 12, wherein the substrate of the reflecting optical spatial modulator element has an antireflection film, on a surface opposite to the micro-mirrors, absorbing light incident on the antireflection film.

15. The image displaying apparatus according to claim 12, wherein the substrate of the reflecting optical spatial modulator element has a surface saw-tooth shape in cross-section, opposite the micro-mirrors, reflecting light incident on the surface with the saw-tooth shape in directions other than the on-direction.

16. The image displaying apparatus according to claim 12, wherein the substrate of the reflecting optical spatial modulator element has a light scattering surface, opposite the micro-mirrors, scattering light incident on the light scattering surface in directions other than the on-direction.

* * * * *